Figure 1:
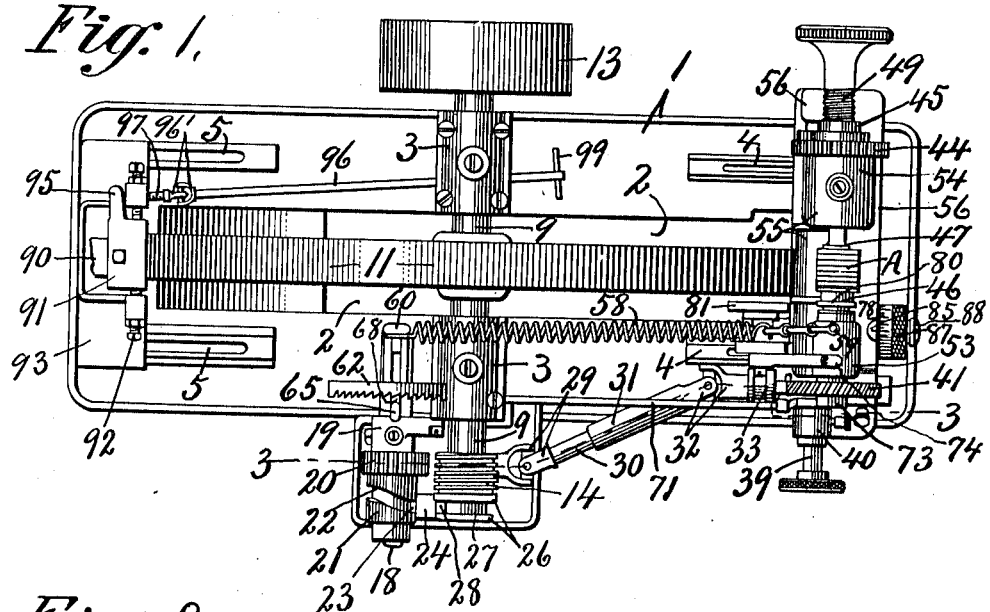

B. F. CLARK.
LENS GRINDING MACHINE.
APPLICATION FILED MAR. 8, 1910.

1,048,658.

Patented Dec. 31, 1912.
3 SHEETS—SHEET 1.

Witnesses
Jos. F. Collins
H. E. Chase

Inventor
B. F. Clark
By Howard P. Denison
Attorney

B. F. CLARK.
LENS GRINDING MACHINE.
APPLICATION FILED MAR. 8, 1910.
1,048,658.
Patented Dec. 31, 1912.
3 SHEETS—SHEET 3.
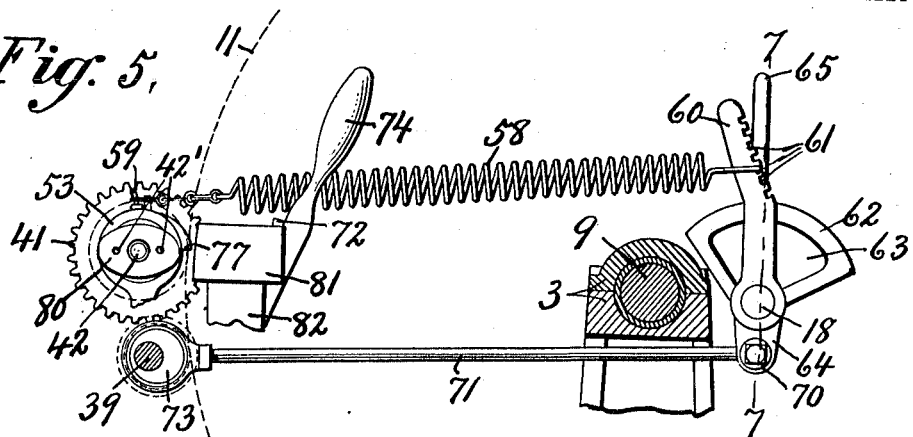
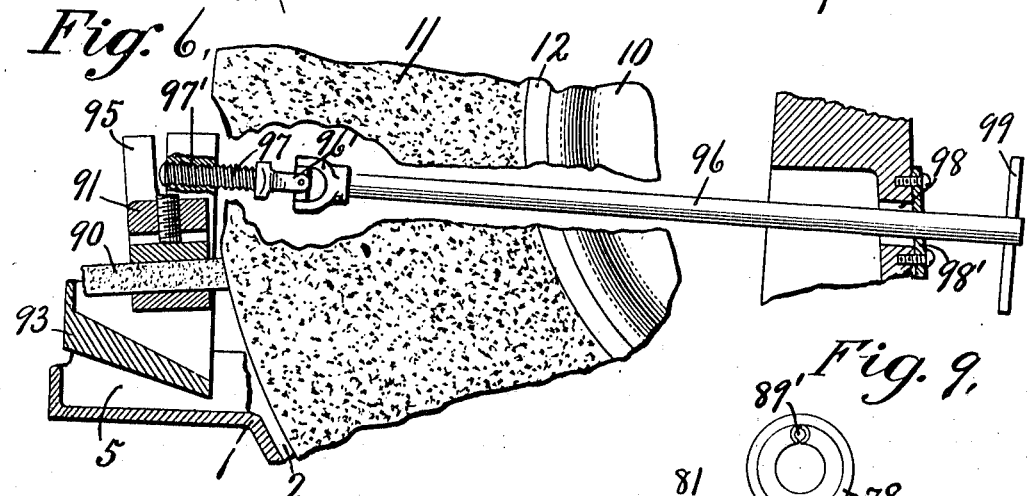
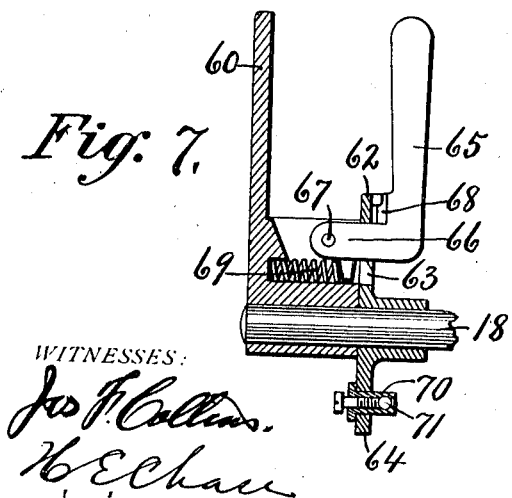
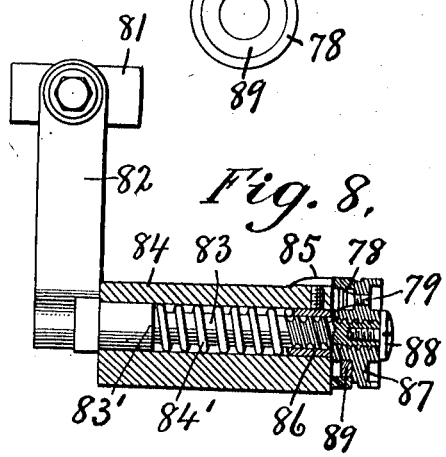

UNITED STATES PATENT OFFICE.

BENNETT F. CLARK, OF GENEVA, NEW YORK, ASSIGNOR TO THE STANDARD OPTICAL COMPANY, OF GENEVA, NEW YORK, A CORPORATION OF NEW YORK.

LENS-GRINDING MACHINE.

1,048,658.  Specification of Letters Patent.  Patented Dec. 31, 1912.

Application filed March 8, 1910. Serial No. 548,073.

*To all whom it may concern:*

Be it known that I, BENNETT F. CLARK, of Geneva, in the county of Ontario, in the State of New York, have invented new and useful Improvements in Lens-Grinding Machines, of which the following, taken in connection with the accompanying drawings, is a full, clear, and exact description.

This invention relates to certain improvements in lens grinding machines of the class set forth in my Patent No. 927,949, dated July 13, 1909, for grinding the edges of lenses to a predetermined size in conformity with any specific pattern.
In this class of machines, the power for rotating the grindstone is usually applied to the shaft thereof and suitable mechanism is provided for automatically moving the grindstone axially and additional mechanism for rotating the lens against the face of the grindstone, the form and size of the lens being determined by a pattern which is coaxial and rotates with the lens against an adjustable rest.
In operation the lenses are preferably held against the periphery of the grindstone by a spring and owing to the fact that the axes of the majority of lenses are of different lengths it is evident that the rotation of such lenses against the grindstone from the short axis to the long axis and vice versa tends to grind the ends of the longer axis faster than the portions at the ends of the shorter axis and one of the objects of my present invention is to provide means whereby this grinding effect may be automatically made more uniform throughout the periphery of the lens and still enable the pressure of the lenses against the stone to be varied at will.

Another object is to simplify the means for adjusting the pattern rest for different sizes of lenses and at the same time to enable such means to be easily calibrated to compensate for wear or to correct imperfect adjustment so as to bring such rest into a position to exactly conform to the reading of the indexing device.

A further object is to provide means operable at will to different positions for locking and releasing the lens carriage in and from its inoperative position and controlling the movement of said carriage to and from the grindstone and also for making and breaking connection between the rotary lens holder and its mechanical driving means and permitting the lens carriage to be shifted to bring any portion of the edge of the lens or lenses into contact with the stone independently of such mechanical driving means.

A still further object is to provide means readily accessible from the front of the machine for adjusting the truing device for the grindstone.

Other objects and uses will be brought out in the following description.

Figure 2:
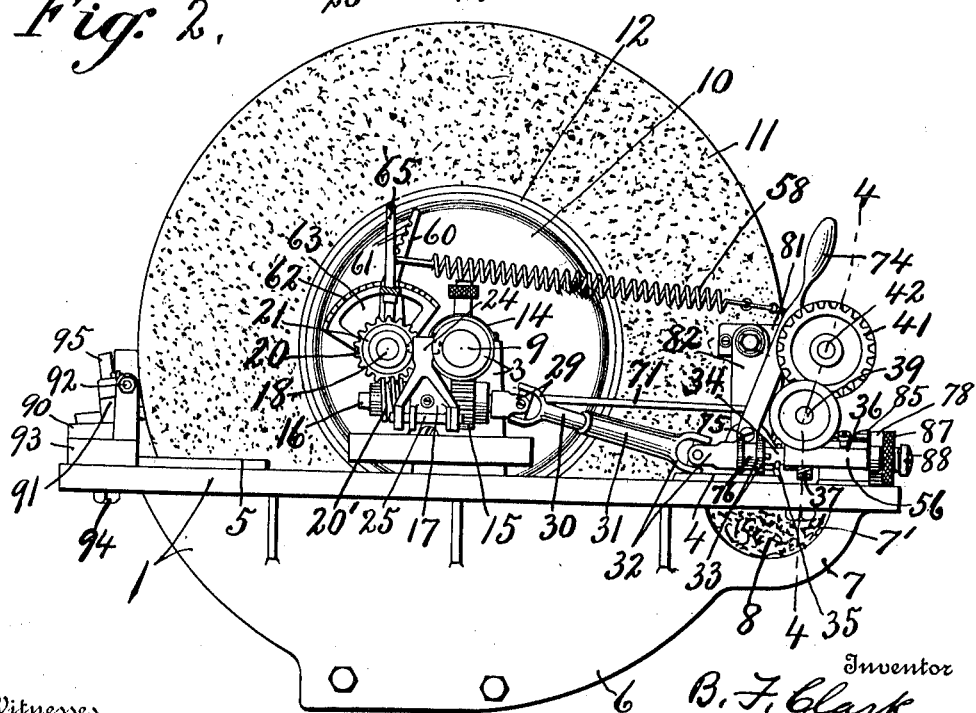
Figure 3:
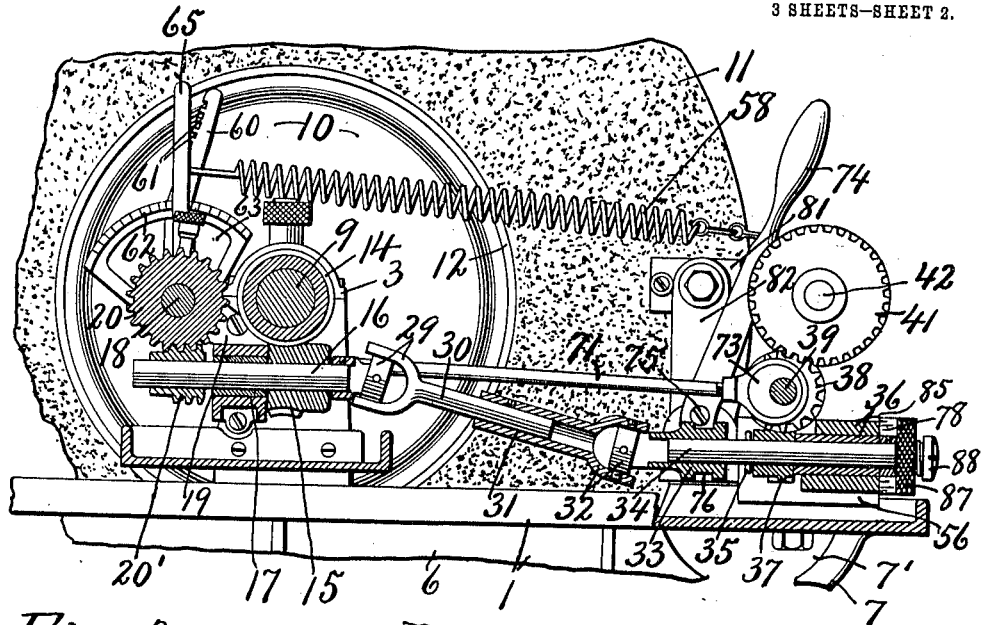
Figure 4:
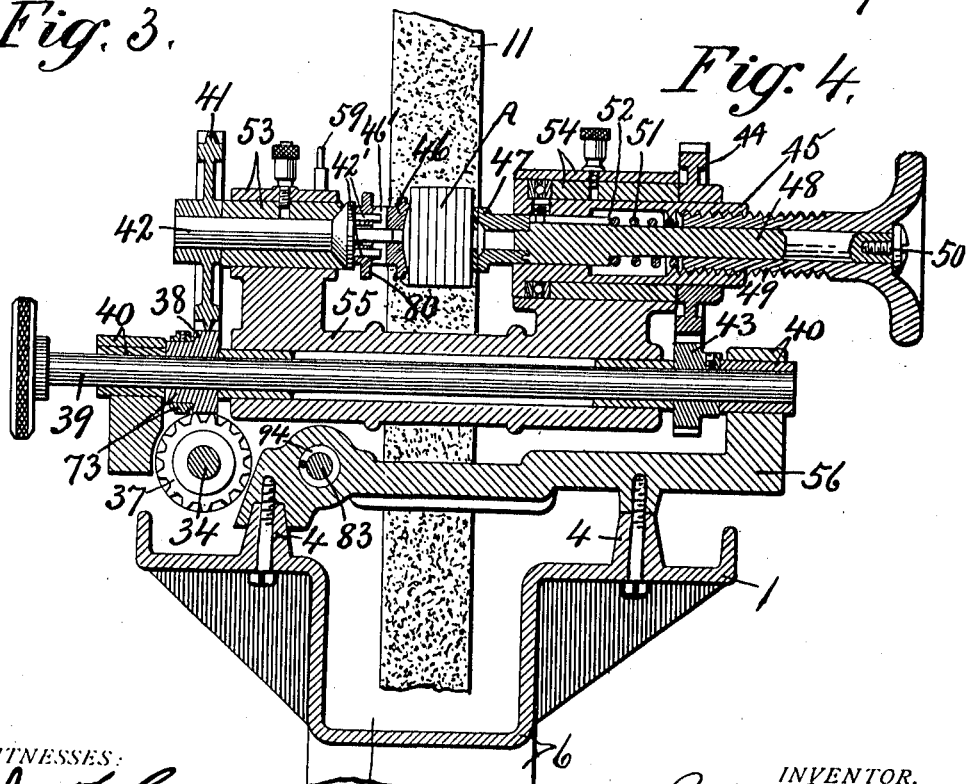

In the drawings: Figures 1 and 2 are respectively a top plan and a side elevation of a lens grinding machine embodying the various features of my invention. Figs. 3 and 4 are enlarged sectional views taken respectively on lines 3—3, Fig. 1 and 4—4, Fig. 2 showing particularly the means for transmitting motion from the grindstone shaft to the lens supporting spindles, the means for automatically regulating the pressure of the lens against the grindstone being shown in elevation. Fig. 5 is an enlarged elevation of the detached automatic pressure regulating and adjusting mechanism for the lens carriage. Fig. 6 is an enlarged elevation partly in section of the adjusting mechanism for the grindstone truing device, a portion of the grindstone being shown in connection therewith. Fig. 7 is a sectional view taken on line 7—7, Fig. 5. Fig. 8 is an enlarged elevation partly in section of the adjustable pattern rest and its adjusting means. Fig. 9 is an inner face view of one of the indexing rings showing particularly the split clamping ring for locking the two index sections together.

The entire mechanisms embraced in my present application are mounted in or upon a suitable base or housing —1— having a central lengthwise cylindrical trough —2—, fixed upright bearings —3— and front and rear guideways —4— and —5— arranged in pairs, as best seen in Fig. 1. The frame —1— may be mounted upon any suitable supporting base, not necessary to herein illustrate or describe, with its upper portion disposed in a substantially horizontal position and its lower portion reduced in width and constituting a segmental housing —6— in which the trough —2— is formed, to receive and confine the drip and grindings from the stone and lenses. The front portion of the housing —6— is provided with an auxiliary reservoir —7— containing a water retaining absorbent such as a sponge —8— which distributes its moisture evenly over the periphery of the grindstone and also keeps the grinding surface clean from grindings and other foreign substances. One side at least of the reservoir —7— is provided with an opening —7'— through which the absorbent may be readily inserted or removed.

The bearings —3— are mounted upon and project upwardly from the central portion of the frame at opposite sides of the trough —2— for receiving and supporting a revoluble driving shaft —9—, to which is centrally secured a circular disk —10— carrying upon its periphery a grindstone —11— the latter being secured to the periphery of the disk —10— by an interposed layer —12—of cementitious nature, said shaft being provided at one end with a pulley —13— just outside of the frame —1— and adapted to be connected by a belt to any available source of power (not shown.) The opposite end of the shaft is provided with a worm —14— meshing with a worm gear —15— on a counter shaft or spindle —16— which is disposed at substantially right angles to and directly under the shaft —9— and is journaled in a suitable bracket —17— upon the adjacent portion of the bearing —3—. A shaft or stud —18— is rigidly secured to a rearward extension —19— of the bracket —17— parallel with the shaft —9— and upon this stud is loosely journaled a gear —20— and collar —21— the latter being secured to the gear —20— and provided with a spiral groove —22— which receives a stud —23— on the upper end of a rock arm —24—. This rock arm —24— is pivotally connected by a spindle —25— to the bracket —17— so as to rock laterally upon an axis at right angles to the axis of the shaft —9—. Secured to the outer end of the shaft —9— and to the worm —14— is an additional collar —26— having an annular groove —27— for receiving a stud —28— also on the upper end of the rock arm —24— and directly opposite the stud —23— so that as the arm —24— is rocked laterally by the spirally grooved collar —21— similar endwise movement will be imparted to the grindstone shaft —9— thereby moving the latter across the faces of the lenses or parallel with the lens supporting spindles hereinafter described.

A worm —20'— is secured to the spindle —16— and meshes with the gear —20— on the stud —18—, so as to transmit rotary motion from said spindle —16— to the spirally grooved collar —21— for moving the shaft —9— axially through the medium of the rock arm —24—, as just described. The shaft or spindle —16— is connected at one end by universal joint —29— to a shaft section —30— which is slidably interlocked and telescopes with a sleeve section —31—, the latter being connected by universal joint —32— to a clutch section —33—. This clutch section is slidably mounted upon an independently rotatable shaft or spindle —34— into and out of engagement with another clutch section —35— which is rigidly secured to said shaft. This shaft or spindle —34— is journaled in a suitable bearing —36— on the bed —56— and is provided with a gear —37— secured thereto. This gear —37— meshes with a gear —38— which is rigidly secured to a shaft —39— extending transversely of the machine directly in front of the grindstone —11— and journaled in suitable bearings —40—, the gear —38— also meshing with a similar but larger gear —41— which is secured to one end of one of the lens clamping spindles —42—.

Secured to the opposite end of the shaft —39— is a gear —43— of substantially the same diameter as the gear —38— and meshing with a gear —44— which is rigidly secured to one end of a rotary sleeve —45— and is of substantially the same diameter as the gear —41— so as to rotate the sleeve —45— at the same rate of speed as the spindle —42—. The spindle —42— and sleeve —45— are provided with lens clamping heads —46— and —47— respectively, the clamping head —47— being detachably interlocked with the adjacent end of a spindle —48— so as to rotate therewith. This spindle —48— extends centrally through the sleeve —45— and is slidably interlocked therewith, so as to move endwise and at the same time to rotate with the sleeve. The outer end of this sleeve is threaded internally and is engaged by a hollow screw —49— which surrounds and is rotatable upon the spindle —48— and is locked thereto against endwise movement in one direction by a cap screw —50—.

A coil spring —51— encircles the intermediate portion of the spindle —48— between the inner end of the screw —49— and a shoulder —52— on said spindle, thus holding the cap screw —50— in engagement with the outer end of the sleeve —49— and affording a yielding connection between the clamping head —47— and said screw to hold the lenses, as —A—, between the clamping heads under yielding pressure.

The spindle —42— and sleeve —45— are journaled respectively in suitable bearings —53— and —54— on a rocking frame or carriage —55— which in turn is journaled upon the intermediate portion of the shaft —39— between the pinions —38— and —43—, so that the swinging axis of the lens supporting frame or carriage —55— is coincident with the axis of the driving pinions for the lens clamping heads thereby permitting the interposed lenses to be moved toward and from the face of the grindstone.

The shaft —39— which supports the rocking frame —55— is mounted upon a sliding bed —56— which may be adjusted along the ways —4— upon the supporting frame —1— to conform to the varying diameters of the grindstone as the latter is worn away and may be held in its adjusted position by any suitable retaining means.

The rocking frame —55— is disposed so as to bring the axis of the lens clamping heads in nearly the same horizontal plane as the axis of the grindstone and when released is drawn toward the grinding surface by a spring —58— having one end provided with links either one of which is adapted to be engaged with an anchorage —59— on the bearing —53— while the other end is connected to an upright rock arm —60— which is journaled on the stud —18—.

The rear end of the spring —58— is adapted to be adjusted vertically into and out of engagement with any one of a series of notches —61— on the rock arm —60— so as to vary the tension of the spring and thereby produce the desired pressure of the lenses against the grindstone.

As a further means for varying the tension of the spring a toothed segment —62— is also journaled upon the stud —18— in close proximity to the inner end of the hub of the rock arm —60— and is provided with a concentric slot —63— and a pendent extension or arm —64—.

A hand operated pawl —65— is provided with an offset —66— projecting through the slot —63— and pivoted at —67— to the rock arm —60— at one side of the axis of the latter, said pawl being provided with a tooth —68— movable into and out of engagement with the teeth of the segment —62— and is normally held in its locking position by spring —69—, as best seen in Fig. 7.

It is now clear that by connecting the pawl —65— to the rock arm —60— in the manner described, the movement of said pawl along the rack —62— will cause a similar movement of the rock arm —60— to vary the tension of the spring —58— as may be desired, the engagement of said pawl with the rack serving to lock the toothed segment and rock arm together for simultaneous action for a purpose presently described.

Journaled in the extension —64— of the segment —62— is a swivel head —70— to which is connected one end of a forwardly extending eccentric rod —71— having its front end connected to an eccentric —73— on the shaft —39— so that as this shaft is rotated rocking motion will be imparted to the toothed segment and rock arm —60—. The clutch —33— is thrown into and out of locking connection with the shaft or spindle —34— by means of a hand lever —74— which is fulcrumed at —75— to the sliding bed —56— and has its lower end engaged in an annular groove —76— on the clutch —33—.

The lever —74— extends upwardly at the rear of and some distance above the frame —55— with which it is adapted to engage to control the movement of such frame toward and from the grindstone and is provided with a shoulder —72— movable into and out of engagement with a similar shoulder —77— on the frame —55— to hold said frame and the lenses carried thereby away from the grindstone against the action of the spring —58—.

The lever —74— may be rocked rearwardly a sufficient distance to release the frame —55— without throwing the clutch —33— into action thereby leaving the rotary lens holder free from its mechanical driving means and permitting any portion of the edge of the lens or lenses to be brought into contact with the stone and held in one position or turned back and forth by hand to grind off excessive projections when desired independently of such driving mechanism or by moving such lever rearwardly a greater distance the clutch may be thrown into action to rotate the lens holder mechanically.

The lenses to be ground are usually elliptical or elongated in one direction and therefore when bearing against the grindstone during the grinding operation cause a rocking movement of the frame —55— and unless some provision is made for keeping the spring —58— under practically uniform tension, it is evident that as the points of contact between the lenses and grindstone change from the short to the long axes, the tension of the spring would be increased producing excessive grinding at such points. In order to obviate this objectionable result, the gears for transmitting motion from the shaft —39— to the lens clamping heads or spindles are proportioned so as to cause the lenses to rotate at substantially half the speed of said shaft, thereby causing the eccentric —73— to make two revolutions during each revolution of the lens holders, said eccentric being adjusted so that when the point of contact at the end of each longer radius of the lens is presented to the grindstone, the longer radius of the eccentric will extend in the same direction and will thereby cause the upper end of the rock arm —60— to move forwardly to maintain practically uniform tension of the spring —58—. In other words as the rocking support for the lens helder is thrown forwardly by contact of the longer axis of the lens with the grindstone, the rock arm —60— will also move forwardly practically the same distance thus causing a bodily movement of the spring back and forth as the contact point of the lens changes from one axis to another, the throw of the eccentric being proportioned to approximately correspond to the eccentricity of the lens.

A lens pattern —80— is mounted upon a pair of pins —42'— on the inner end of the spindle —42— having a central axially projecting stud for receiving and supporting the clamping head —46—, the latter being provided with radial slots —46'— for receiving the inner ends of the pins —42'— and thereby locking the head to the spindle for rotary movement therewith. The periphery of the lens pattern —80— rides against a pattern rest —81— which is mounted upon an upright arm —82— of a horizontal adjustable spindle —83—, as best seen in Fig. 8. This spindle is slidably mounted in a suitable bearing —84— on the sliding bed —56— having a fixed index —85— on top of the front end thereof within which is secured a fixed bushing —86—. The spindle —83— extends some distance through and beyond the front end of the bearing —84— and is threaded for receiving a threaded nut —87— which is held in place against endwise displacement by cap screw —88—.

The inner end of the nut —87— is reduced in diameter and is surrounded by a split ring —89— and an index ring —78— having graduations upon its periphery numbered to correspond to standard sizes of lenses. The graduated ring —78— is adjustable circumferentially around and upon the split ring —89— which is provided at its meeting edges with a conical bearing or socket for receiving a conical end of an expanding screw —79—, the latter being screwed into a threaded aperture in the nut —87— parallel with its axis. As the expanding screw —79— is loosened the split ring —89— contracts under its own tension sufficiently to release the graduated ring —78— which may then be adjusted relatively to the nut to make the reading correspond to the position of the pattern rest —81— for a predetermined size of lens after which the screw —79— may be tightened to expand the split ring —89— frictionally against the inner face of the graduated ring —78— thereby locking said rings to the nut —87—. The object of this adjustment of the graduated ring —78— relative to the nut is to compensate for wear of the grindstone or of the pattern or pattern rest or to rectify any imperfect adjustment of such rest, so that when the latter is set for a predetermined size of lens and the reading of the graduated ring corresponds to such adjustment, the turning of the nut to bring any other graduation into registration with the fixed index —85— will effect the proper adjustment of the lens rest —81— to give that particular size of lens. This adjustment of the lens rest is aided by a coil spring —84'— which surrounds the spindle —83— and is interposed between a shoulder —83'— on said spindle and the rear end of the bushing —86— so as to exert a rearward pressure upon the lens rest tending to frictionally hold the nut against accidental turning by end thrust pressure against the ring —78— which in turn similarly engages the adjacent end face of the bushing —86—.

The stone truing mechanism comprises a block or body —90— of suitable abrasive material clamped in place upon a rocking support —91— at the rear of the grindstone, said support being pivoted at —92— upon a forwardly and rearwardly adjustable frame —93— which is mounted upon the ways —5— and held in its adjusted position by clamping bolts —94—. This support —91— is provided with an abutment —95— extending upwardly above the pivot —92— while the abrasive block —90— is located below said pivot and is adapted to be forced into engagement with the periphery of the grindstone with more or less pressure by means of an adjusting rod —96— having its rear end connected by universal joint —96'— to a threaded extension —97— which is engaged in a threaded aperture —97'— in the upper portion of the frame —93— and adapted to engage the abutment —95— for varying the pressure of the abrasive block —90— against the periphery of the grindstone as the rod —96— is turned. This adjusting rod —96— extends forwardly through an opening —98— on the upright portion of the frame —1— which supports the right hand bearing —3— and is preferably held in place by a perforated plate —98'—.

The front end of the rod is provided with a handle —99— within convenient reaching distance from the front of the machine so as to permit a convenient adjustment of the abrasive block when desired, the universal joint —96'— serving to prevent binding of the threaded extension —97— in the threaded aperture —97'—.

It will be observed upon reference to the drawings that all of the rotary parts such as shafts, spindles and sleeves are journaled in removable bushings in their respective bearings, so that they may be removed when worn and replaced with new ones, thereby preserving the original parts in which such bushings are mounted and also reducing the cost of manufacture and maintenance of the machine.

In Fig. 3 the opposite ends of the carriage —55— are shown as provided with comparatively short bushings in which the shaft —39— is journaled, said bushings being spaced some distance apart to form an intervening oil chamber.

What I claim is:

1. In an edge grinding machine for lenses, a driving shaft, a rotary grinder on the shaft, a worm secured to the shaft, a counter-shaft running transversely of the driving shaft and provided with a worm gear meshing with said worm, a worm on the counter-shaft, a stud running parallel with the driving shaft, a worm gear loose on the stud and meshing with the worm on the counter-shaft, a spirally grooved collar secured to the worm gear on the stud, a rocking member actuated by the grooved collar, connections between the rocking member and driving shaft for moving the latter axially, telescoping shaft sections splined one upon the other, one of said shaft sections being connected by a universal joint to the counter-shaft, a rotary spindle having a clutch section rigid thereon, a coöperative clutch section slidable on the spindle into and out of engagement with the first named clutch section and connected by a universal joint to the other telescoping shaft section, a rotary transverse shaft across the front face of the grinder and provided with a hand piece whereby it may be rotated by hand, a pair of gears secured to said transverse shaft, a gear rigid on the spindle meshing with one of said gears, a rocking frame journaled on the transverse shaft, rotary lens clamping means mounted on the frame and provided with gears meshing with the gears on the transverse shaft, means including a spring for rocking the frame with the lenses thereon toward the grinder, and hand operated means for shifting the sliding clutch and for rocking the frame away from the grinder when the clutch is thrown out of action.

2. In an edge grinding machine for lenses, a driving shaft, a rotary grinder on the shaft, a transverse shaft running across the front face of the grinder parallel with the driving shaft, means including a clutch for transmitting rotary motion from the driving shaft to the transverse shaft, a rocking frame journaled on the transverse shaft, rotary lens holders mounted on the frame, co-axial rocking members adjustable rotarily relatively to each other, movable means for locking said members to each other to move together, a spring having one end connected to one of said members and its other end connected to the rocking frame to draw said frame toward the grinder, an eccentric on the transverse shaft, a rod connecting said eccentric to the other of said co-axial rocking members, and a clutch shifting lever operable at will to throw the clutch into and out of action, said lever being positioned to engage and rock the frame away from the grinder against the action of the spring when the clutch is thrown out of action.

3. In an edge grinding machine for elliptical lenses, a driving shaft, a rotary grinder mounted on the shaft, a gear supporting stud, means actuated by the driving shaft and including a gear on the stud for reciprocating the driving shaft and grinder axially, separately movable rocking members journaled on the stud, means for locking the said rocking members to each other to rock in unison, a transverse shaft extending across the front face of the grinder, a rocking frame journaled on the transverse shaft, rotary lens clamping devices mounted on the frame, means for transmitting rotary motion from the driving shaft to said transverse shaft, additional means for transmitting rotary motion from the transverse shaft to the lens clamping device, a spring having one end connected to the rocking frame and its other end connected to one of the rocking members, an eccentric on the transverse shaft, and connections between said eccentric and the other rocking member for locking both members when they are locked to each other.

In witness whereof I have hereunto set my hand on this 28th day of February, 1910.

BENNETT F. CLARK.

Witnesses:
 CLARENCE E. QUIMBY,
 ALBION W. NEWELL.